United States Patent Office 3,305,884
Patented Feb. 28, 1967

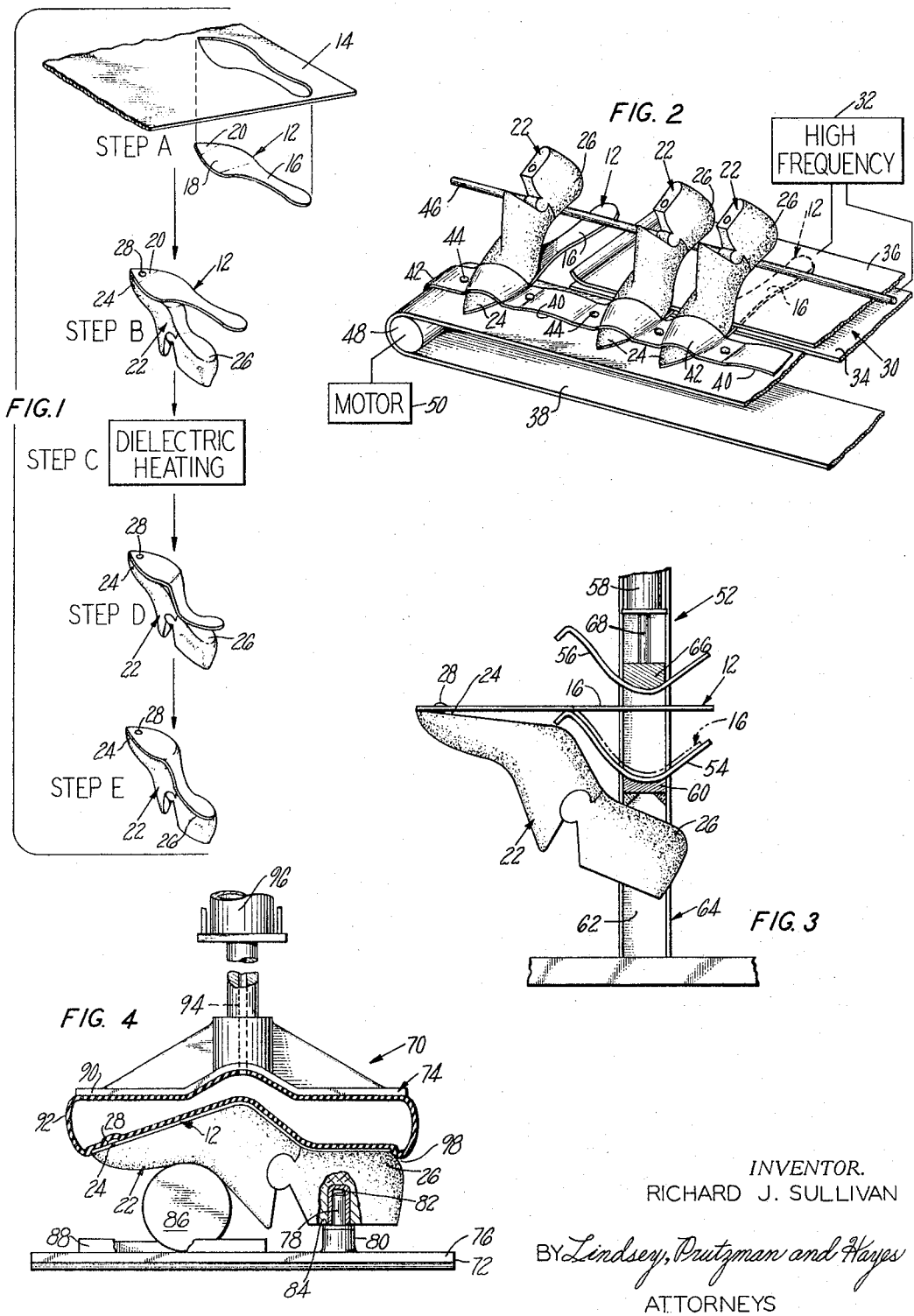

3,305,884
METHOD AND APPARATUS FOR
MOLDING INSOLES
Richard J. Sullivan, Manchester, Conn., assignor to
Colonial Board Company, Manchester, Conn., a corporation of Connecticut
Filed Sept. 28, 1964, Ser. No. 399,617
13 Claims. (Cl. 12—146)

The present invention relates to a method and apparatus for forming the insoles of shoes and other articles of footwear. More particularly the invention relates to a new and improved method and machine for providing an insole of improved quality having a molded shank area.

A principal object of the present invention is to provide a method and apparatus for moldably forming an insole of perfect last conformity which possesses a rigid and strengthened shank portion and provides excellent support while affording greater comfort to the foot of the wearer.

Another object of the present invention is to provide a machine and method which not only effectuates perfect conformity of the insole to the last but does so irrespective of the size or type of last while obviating the necessity of adding reinforcing structure to the shank of the insole in order to impart strength and rigidity thereto.

A further object of the invention is to provide a method and apparatus which facilitates the molding of the insole on the last and eliminates the inherent spring-back of the molded insole due to its elastic memory.

An additional object is to provide an insole of perfect last conformity by a relatively facile, flexible and economical technique which can be utilized on any insole configuration desired without the necessity of varying or modifying the contouring or molding means of the apparatus.

Other objects will be in part obvious and in part pointed out more in detail hereinafter.

The invention accordingly comprises the several steps and the relation of one or more of such steps with respect to each of the others and the article possessing the features, properties, and the relation of elements, which are exemplified in the following detailed disclosure, and the scope of the application of which will be indicated in the claims.

In the drawing:

FIG. 1 schematically illustrates the steps employed in the method of the present invention;

FIG. 2 shows a perspective view partially broken away of the essential portions of the heating unit constituting part of the apparatus of the present invention;

FIG. 3 shows a side view, partially broken away, of the portion of the apparatus utilized for the initial contouring operation illustrated as Step D in FIG. 1; and FIG. 4 is a side view of the final molding operation according to the present invention.

Referring now to the drawings in greater detail wherein like referenced characters indicate like parts throughout the several figures, the method of the present invention is illustrated in FIG. 1 in a schematic manner for purposes of clarity of description and ease of understanding. According to this process an insole blank is initially cut or punched (Step A) from a plastic containing fiber board to provide a size and shape suitable for the particular last to be utilized. The plastic fiber board material may constitute the entire insole blank, as shown; however, preferably only the portion rearwardly of the ball of the foot, namely the shank and heel portions of the insole, are made from this material. Standard fiber board material or soft leather may be utilized for the remainder of the insole. An insole, cut to the proper size and configuration, is then properly aligned on the toe area of the last and is removably adhered to the last (Step B) by suitable means such as a single tack or by pressure-sensitive adhesive. The insole blank, being adhered only at the toe portion, is separated from the last along a substantial portion of its length due to the contoured configuration of the last and the relative stiffness of the fiber board insole blank. The separated free portion of the blank which is to constitute the shank of the insole is then heated dielectrically (Step C) to above the molding temperature of the plastic material within the fiber board. The insole blank with the plastic therein in a softened or moldable condition is then subjected to a "prebreaker" (Step D) which overmolds the shank portion of the insole to provide a greater curvature in the shank portion than is required by the end product. It is imperative that this overmolding operation be performed in order to obtain the perfect last conformity which is desired for the final product. The premolded fiber board is placed in registry with the last along its entire length and is compressively molded to the last (Step E) thereby providing the desired perfect last conformity. The plastic material which coalesces during the heating and forming operation tends to harden upon cooling to provide a rigid structure which imparts greater strength to the cellulosic fiber board and obviates the necessity of the previously used reinforcing structures within the shank portion of the insole. The resultant contoured insole may then be removed from the last for later use. Preferably, however, the last and the insole are additionally adhered in the heel area during the final molding operation and the combination is then utilized as a unit to which the upper portions of the shoe or other article of footwear are applied.

As shown, the initial operation according to the present invention is the cutting or punching of an insole blank 12 from a plastic impregnated sheet 14 by any suitable means such as a cutting punch or die. It will be appreciated that the size of the blank 12 will vary not only with the length and width of the last to which the insole will be fitted, but also with the type or style of last to be used, for example with lasts for high heel or low heel shoes. However, as mentioned hereinbefore, it is generally preferred to utilize a plastic impregnated board for only the shank portion 16 of the blank 12 while employing conventional fiber board or other more flexible materials, such as leather, for the ball and toe portions 18, 20 respectively, of the insole blank 12. When joining the shank portion 16 and ball portion 18 of such a combination care must be taken to use an adhesive which will not lose its adhesiveness upon subsequent heating and bending of the insole blank. Consequently, cements or adhesives which are heat insensitive or which will not permit delamination up to about 300° F. or more are required. In this regard, rubber-based adhesives have been found satisfactory although any cement which possesses the required thermal stability may be employed.

The sheet 14 of fibrous material generally employed for use in making insoles according to the present invention and particularly the shank portions thereof, is a cellulosic fiber board material containing a resin impregnated throughout the sheet, which resin is capable of being softened and molded upon the application of heat. Such sheets generally contain thermoplastic resins as the moldable material; however, boards containing thermosetting resins may also be utilized so long as they also are capable of being softened and molded during the shank forming operation. The boards are generally made from cellulosic fibers in a manner well known in the papermaking industry with the resin impregnate incorporated therein during the formation of the sheet.

The insole blanks 12 are generally cut along the machine direction of the fiber sheet 14 since the board is generally a directional material and the fibers within the blank have been found to give greater support and strength to the insole when cut or punched in this directional manner.

Although the sheets may vary in thickness from approximately 1/32 of an inch to about 3/16 of an inch or thicker, it is generally preferred to utilize those materials which have a thickness of approximately 1/8 of an inch for the shank portion of the insole. It has been found when using such material that optimum strength and rigidity is obtained, particularly when sufficient resin is present in the material. In this regard sheets containing up to 30% or more resin have been found to give excellent results.

Typical of the plastic impregnated, cellulosic, fiber board material which has been used according to the present invention with repeated success is the thermoplastic impregnated fiber board material "THERM-X" sold by Colonial Board Company of Manchester, Connecticut.

The flat insole blank 12 possessing the moldable shank portion 16 is placed in abutting relationship to the bottom of a conventional last 22 and removably adhered thereto by joining only the toe portion 20 of the blank 12 to the bottom of the toe portion 24 of the last. Since the toe and ball portions, 20 and 18, of the blank 12 have already been cut to the desired size and since no further molding or conforming operations need be performed on these portions, the toe 20 of the blank may be accurately aligned to the last and affixed thereto in a manner which will securely maintain this relationship during the subsequent molding operations as well as the additional manufacturing procedures involved in making the shoe. The blank 12 should of course be properly arranged on the last so as to be in proper register with the bottom thereof and cover the entire toe and ball portions of the last. As shown, the rearward portion of the blank 12 and particularly the thermoplastic impregnated shank portion 16, due to its relative stiffness extends rearwardly from the toe 20 in generally the same plane and consequently is separated from the contoured heel portion 26 of the last.

As shown in Step B of FIG. 1, the blank 12 may be adhered to the last 22 by means of a single tack 28 which passes through portion 20 of the blank into a suitable area of the toe portion 24 of the last so as to secure the blank to the last during all of the subsequent operations. It will be understood that in place of the tack 28 a pressure-sensitive adhesive or other securing means may be employed where it is desired to employ holding means other than the tack 28.

After properly adhering the insole blank 12 to the last 22 so as to permit substantial separation between the shank 16 and the heel portion 26 of the last, the shank 16 is readied for the molding operations of Steps D and E. This is accomplished by heating the shank 16, particularly the plastic impregnated therein, to a temperature slightly above the molding temperature for the plastic impregnated. However, it has been found that this softening or coalescing of the thermoplastic material must be carried out by dielectric heating techniques due to the nature of the cellulosic component of the material and the more uniform heating supplied thereby.

An apparatus for effectuating this heating procedure is shown in FIG. 2. The apparatus, generally designated 30, comprises a high frequency source of electrical power 32 which is attached in a suitable manner to a pair of closely spaced, parallel, metal plates 34, 36, between which pass the shank portion 16 that is to be heated. As shown, the last 22 with the blank 12 attached to the toe 24 thereof may be carried in an upright position on an endless conveyer belt 38 which is positioned immediately adjacent the plates 34, 36, the top longitudinal travel of the belt 38 being generally in the same plane as lower plate 34. The conveyor 38 provides on its outer surface a plurality of pockets 40 into which is snugly positioned the toe 24 of the last. The pockets 40 are formed by affixing to the belt 38 at spaced intervals an encircling, loosely fitting, restraining strap 42 of substantially narrower width than the conveyer belt 38. The strap 42 is adhered to the belt by suitable means, such as buttons 44, which divide the strap into separate pockets along the entire outer surface of the endless belt 38. Positioned above and generally parallel to the plates 34, 36 is a rod 46 which serves as a support for the heel 26 of the last maintaining it in a substantially separated position from the shank portion 16 of the blank 12.

The endless conveyor belt 38 may be moved at a controlled rate by means of drive roll 48 which in turn is driven by the motor 50 through suitable connecting means, not shown. The speed of the belt 38 may be controlled so as to maintain the shank of the insole blank within the high frequency field for a sufficient period of time to permit the heating thereof. It will be understood that the time required for heating the plastic within the cellulosic fiber board may vary depending upon such factors as the thickness of the shank. However, generally a conveyor speed which effectuates movement of the shank along the entire length of the heating elements over a period of approximately one minute has been found suitable for the present invention. During such a period the plastic is heated throughout to a temperature of approximately 200° F. or more. Where a single speed motor is utilized, compensation for the various thicknesses of the shank portions can be effectuated by varying the high frequency field between the plates 34, 36, so as to accomplish the desired heating within the space limitations of the apparatus.

In operation, the last-insole assembly may be manipulated in such a manner that the shank only of the insole is heated to a moldable state. As shown, the toe portion of the assembly is placed within one of the pockets 40 on the conveyor 38 while the heel only of the last is placed on the support rod 46. Thereby the separation which naturally occurs between the heel portion 26 of the last and the shank 16 of the insole due to the contoured shape of the last and the relative stiffness of the insole is maintained and permits the ready insertion of the shank 16 between the plates 34, 36. The assembly is then continuously conveyed by movement of the belt 38 past the heating station wherein the shank 16 is dielectrically heated to a uniform temperature sufficient to permit the molding thereof.

The heated shank while in a moldable state is then subjected first to a "prebreaker" which imparts to the insole an exaggerated contoured configuration and then to the final last-conforming molding operation. In accordance with the present invention it has been found that the overmolding of the shank portion of the insole in the "prebreaker" is essential to the production of an insole which acquires and maintains perfect last conformity. As mentioned hereinbefore, the cellulosic fiber board is a directional material of only slight flexibility and possesses an inherent tendency to return after molding to its original configuration. This "spring-back" or elastic memory of the fiber structure is overcome according to the present invention by imparting to the material an exaggerated shank configuration within the "prebreaker" shown in FIG. 3.

The "prebreaker" 52 is, in essence, a cold stamping machine which by means of a quick forceful stroke imparts to the shank 16 of the insole the desired exaggerated shank configuration. Operatively positioned between the heater 30 and the final molding press, the "prebreaker" 52 generally comprises a pair of molding dies or elements 54, 56 adapted to receive and contour the heated shank portion 16 of the blank 12 and an actuating member 58 connected to one of the elements for providing the force required to perform the desired work function. As shown, the lower die 54 is a generally smooth metal plate having a Z-shaped cross section wherein the legs of the Z are disposed with respect to the intermediate portion at an angle of about 90°. While the exact cross-sectional contour may vary, it is required that the die impart to both ends of the shank a greater curvature than is found in any style of shoe presently in use. The die 54 is fixedly secured to a base member 60 which in turn is mounted within the U-shaped channels 62 of a pair of spaced upright support members 64, only one of which is shown in FIG. 3. Provided immediately above die 54 is a mating die 56 supported on its respective base 66 which is adapted to reciprocably slide within the channels 62 of upright support 64. Die 56 is provided with essentially the same Z-shaped cross-sectional configuration as die 54 and cooperates therewith to impart the exaggerated shank contour to the portion 16 of the heated insole blank 12. The base 66 of die 56 is operatively connected through rod 68 to the pressure cylinder 58 which houses a pneumatically actuated piston and is suitably connected to a source of compressed air. As mentioned, the overmolding operation is generally accomplished by a rather rapid stamping type operation. This is readily accomplished by the pneumatic cylinder 58 which is capable of performing work at about 150 to 200 p.s.i.

The overmolded shank portion of the insole while still in a flexible and moldable condition is then indexed or aligned to the heel 26 of the last 22 by suitable means, not shown, and is placed within a press which effectuates the final molding operation. This final step imparts to the insole the full and complete contour of the last including the intricate curvature within the shank portion thereof, thereby providing an insole construction which gives greater comfort and firmer support to the arch.

Referring now to FIG. 4 there is shown a press of the diaphragm type suitable for the final molding operation on the insole. The press, generally designated 70, comprises a support or mount 72, on which is positioned the last 22, and a slightly contoured, resilient platen 74. The support of mount 72 consists essentially of a base plate 76 provided with a heel supporting pin 78 mounted at substantially a right angle to the plate 76 by means of pin support 80. As shown, the heel portion 26 of last 22 is provided with a slot or cavity 82 for receiving pin 78, pin support 80 being of greater dimensions than slot 82 and providing a shoulder 84 on which heel portion 26 is supported. Located forwardly of pin 78 is a toe support assembly comprising a cylindrical instep support 86 freely movable toward and away from the pin 78 within a quadrangular barrier or stop 88. The free movement of cylindrical support 86 permits the forward and rearward adjustment necessary for different sized lasts. It has been found that best results are obtained when the mount 72 is set at an angle to impart a slight side tilt to the last 22.

The contoured platen 74 comprises essentially a platen plate 90 to which is attached a resilient cushion or inflatable diaphragm 92. The cushion 92 may be of a yieldable rubberlike material but, preferably, is a pliable baglike member adapted to receive pressurized fluids, such as air, oil or water under pressure. Where a pressurized fluid is utilized it passes through conduit 94 connected to plate 90 from the supply cylinder 96, the conduit and plate being further capable of reciprocal movement toward and away from the last. As shown, the diaphragm is larger than the last and tends to overlap the edges thereof as shown at 98 of FIG. 4.

The pressure exerted by the diaphragm need only be sufficient to effectuate full and intimate contact between the insole and the last. Generally, a pressure of about 300 to 400 p.s.i. for a period of about one minute will produce satisfactory results.

The insole generally has cooled sufficiently during the molding operations to fix its shape in the contoured configuration. Further, the coalesced plastic upon cooling and setting imparts to the cellulosic fibers greater strength and a more rigid structure thereby obviating the need for additional shank reinforcement. The contoured insole exhibits subsequent to the molding of Step D complete and substantially perfect last conformity. The insole may now be removed from the last and stored for later use or, preferably, further secured to the heel portion 26 by suitable means. If the insole-last assembly is kept intact it may then be used as the base for applying the uppers of the shoe or other article of footwear.

As can be seen from the foregoing description, the present invention provides a method and apparatus for effectuating perfect last conformity in an insole for footwear and the like. The method provides in a facile manner a technique for eliminating the "spring-back" problem of molded insoles while the apparatus is sufficiently flexible to be utilized for all shoes regardless of the size or style of last employed. Further, this is accomplished while obviating the need for additional reinforcement in the shank of the shoes and while providing greater comfort and firmer support for the arch of the user.

As will be apparent to persons skilled in the art, various modifications and adaptations of the structure above described will become readily apparent without departure from the spirit and scope of the invention, the scope of which is defined in the appended claims.

I claim:

1. A method of producing an insole of perfect last conformity for use in articles of footwear and the like comprising the steps of providing an insole blank having in at least the shank portion thereof a moldable plastic; dielectrically heating at least the shank portion of said insole to the molding temperature of the plastic; imparting to the heated shank portion of the insole an exaggerated shank configuration of greater curvature than that exhibited by the last to which the insole is to conform; and subsequently molding the heated insole to the last to provide full intimate contact between the insole and the last.

2. A method of producing an insole of perfect last conformity for use in articles of footwear and the like comprising the steps of providing an insole blank having in at least the shank portion thereof a fibrous material containing a moldable plastic; removably adhering the toe portion of said insole to the toe portion of a last; dielectrically heating at least the shank portion of said insole to the molding temperature of the plastic; imparting to the heated shank portion of the insole an exaggerated shank configuration of greater curvature than that exhibited by the last; and subsequently molding the heated insole to the last to provide full intimate contact between the insole and the last.

3. A method of producing an insole of perfect last conformity for use in articles of footwear and the like comprising the steps of providing an insole blank having in at least the shank portion thereof a fibrous material containing a moldable plastic; removably adhering the toe portion of said insole to the bottom of the toe portion of a last; dielectrically heating at least the shank portion of said insole to above the molding temperature of the plastic while said respective toe portions are adhered; imparting to the heated shank a generally Z-shaped longitudinal configuration of greater curvature than that exhibited by the last; and subsequently molding the heated insole to the last to provide full intimate contact between the insole and the last.

4. The method of claim 3 wherein the toe portions are removably adhered by means of a single tack.

5. The method of claim 3 wherein the toe portions are removably joined by pressure-sensitive adhesive.

6. A method of producing an insole of perfect last conformity for use in articles of footwear and the like comprising the steps of providing an insole blank having in at least the shank portion thereof a cellulosic fiber material containing a moldable plastic; placing the toe portion of said insole in registry with the toe portion of a last and removably adhering the respective toe portions; dielectrically heating at least the shank portion of said insole to above the molding temperature of the plastic while said respective toe portions are adhered; imparting to the heated shank a generally Z-shaped longitudinal configuration of greater curvature than that exhibited by the last; and subsequently molding the heated insole to the last to provide full intimate contact between the insole and the last.

7. A method of producing an insole of perfect last conformity for use in articles of footwear and the like comprising the steps of providing an insole blank having in at least the shank portion thereof a cellulosic fiber material impregnated with a moldable plastic; dielectrically heating the shank portion of said insole to above the molding temperature of the plastic; imparting to the heated shank a generally Z-shaped longitudinal configuration of greater curvature than that exhibited by the last; indexing the heel of the heated insole to a last and subsequently molding the heated insole to the last to provide full intimate contact between the insole and the last.

8. A method of producing an insole of perfect last conformity for use in articles of footwear and the like comprising the steps of providing an insole blank having in at least the shank portion thereof a cellulosic fiber material impregnated with a moldable thermal activated plastic; placing the toe portion of said insole in registry with the bottom of the toe portion of a last and removably adhering the respective toe portions; dielectrically heating the shank portion of said insole to above the molding temperature of the plastic while said respective toe portions are adhered; imparting to the heated shank a generally Z-shaped longitudinal configuration of greater curvature than that exhibited by the last; indexing the heel of the heated insole to the last and subsequently molding the heated insole to the last to provide full and complete intimate contact between the insole and the last.

9. A method of producing an insole of perfect last conformity for use in articles of footwear and the like comprising the steps of forming at least the shank portion of an insole blank from a cellulosic fiber sheet material impregnated with a moldable thermoplastic; removably securing said insole blank in registry with the toe portion of a last; dielectrically heating the shank portion of said blank to at least about 200° F. and above the molding temperature of the thermoplastic while the blank and last are adhered; stamping the heated shank into a generally Z-shaped longitudinal configuration of greater curvature than that exhibited by the last; indexing the heel of the heated insole blank to the last and subsequently molding under pressure the heated insole to the last to provide full and complete intimate contact between the insole and the last.

10. The method of claim 9 wherein the shank of the insole is punched from the cellulosic fiber sheet material.

11. In an assembly for imparting perfect last conformity to an insole of an article of footwear and the like comprising a dielectric heating station having a pair of closely spaced heating plates and a molding press for configuring an insole blank to a last, a conveying means positioned adjacent said plates for moving at least the shank portion of the insole blank through said heating station, a prebreaker positioned in operative relationship between the heating station and the press including means for imparting to the shank portion of the insole a generally Z-shaped longitudinal contour of greater curvature than that exhibited by the last to which the insole is to be configured, the molding press including resilient pressure-applying means for compressively imparting to the insole blank the configuration of the last.

12. In an assembly for imparting perfect last conformity to an insole for an article of footwear and the like comprising a dielectric heating station having a pair of closely spaced heating plates and a molding press for configuring an insole blank to a last, a conveyer positioned immediately adjacent the dielectric heating plates for moving at least the shank portion of the insole blank between said plates, a prebreaker positioned in operative relationship between the heating station and the press including a pair of mating generally Z-shaped dies, one of said dies being reciprocably movable into and out of engagement with the other of said dies to impart to the heated shank portion said Z-shape, and a pressurized actuating means operatively connected to said movable die, the molding press including a support for a last and a resilient pressure platen movable into engagement with the last positioned on the support for compressively imparting to the insole blank the configuration of the last.

13. In an assembly for imparting perfect last conformity to an insole for an article of footwear and the like comprising a dielectric heating station having a pair of closely spaced heating plates and a molding press for configuring an insole blank to a last, a conveyer provided with pockets for receiving the toe portion of the last and insole, said conveyer being positioned immediately adjacent to and coextensive with the spaced dielectric heating plates so that the shank of said insole may pass between said plates, a heel-supporting rod positioned above and generally parallel to said plates for maintaining separation between the heel of the last and the shank of the insole blank during the heating thereof, a prebreaker positioned in operative relationship between the heating station and the press including a pair of mating generally Z-shaped dies, one of said dies being reciprocably movable into and out of engagement with the other of said dies to impart to the heated shank portion said Z-shape, and a pneumatic cylinder operatively connected to said movable die, the molding press including a support for the last and a resilient pressure platen movable into engagement with the last positioned on the support for compressively imparting to the insole blank the configuration of the last.

References Cited by the Examiner
UNITED STATES PATENTS 2,926,435  3/1960  Maling _____ 12—146 X
2,934,771  5/1960  Willmott _____ 12—21

PATRICK D. LAWSON, *Primary Examiner.*